Figure 1:
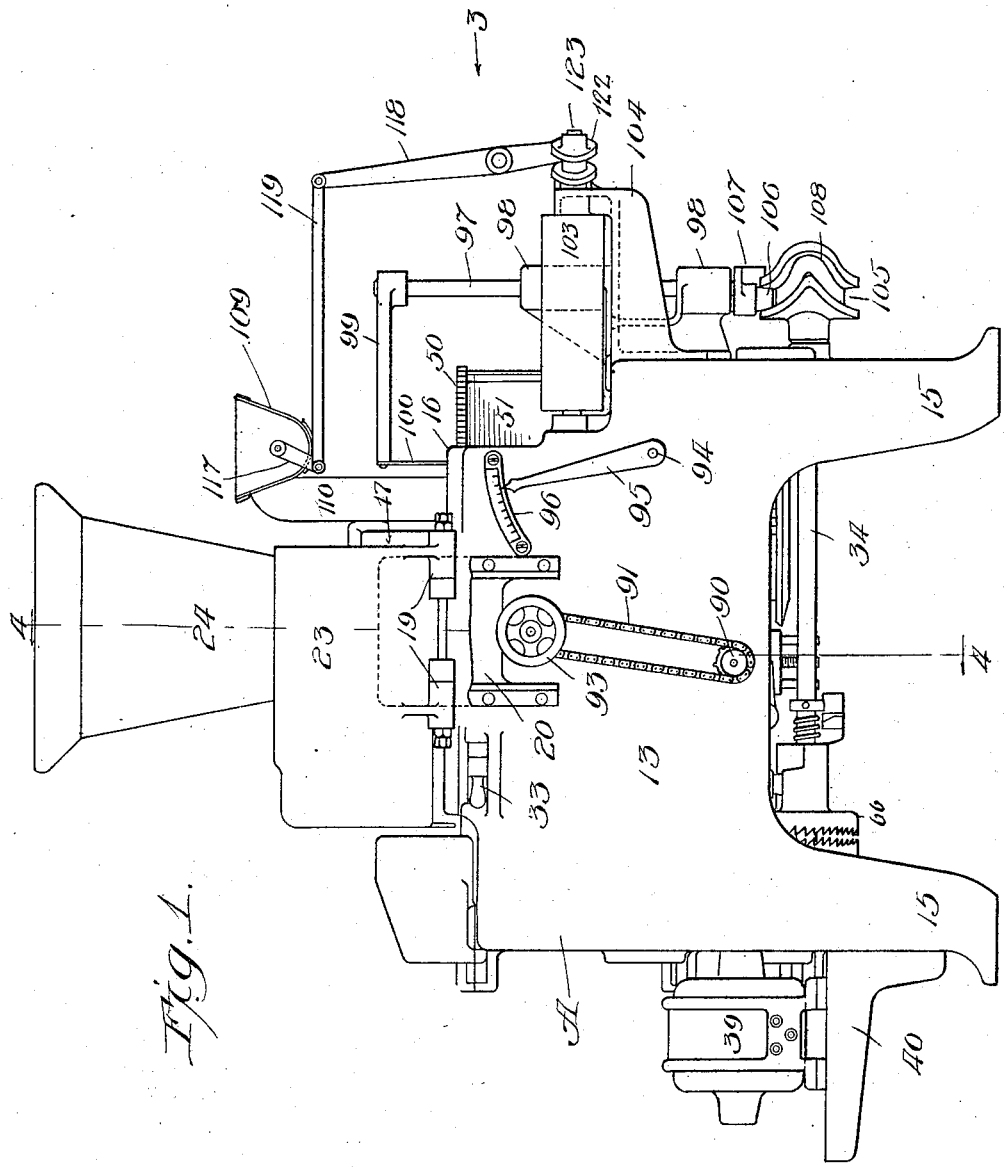

F. STREICH.
DOUGH SCALING MACHINE.
APPLICATION FILED JULY 23, 1917.

1,278,517.

Patented Sept. 10, 1918.
6 SHEETS—SHEET 1.

Witness:
Harry S. Gaither

Inventor:
Frank Streich
by Charles O. Shervey
Atty

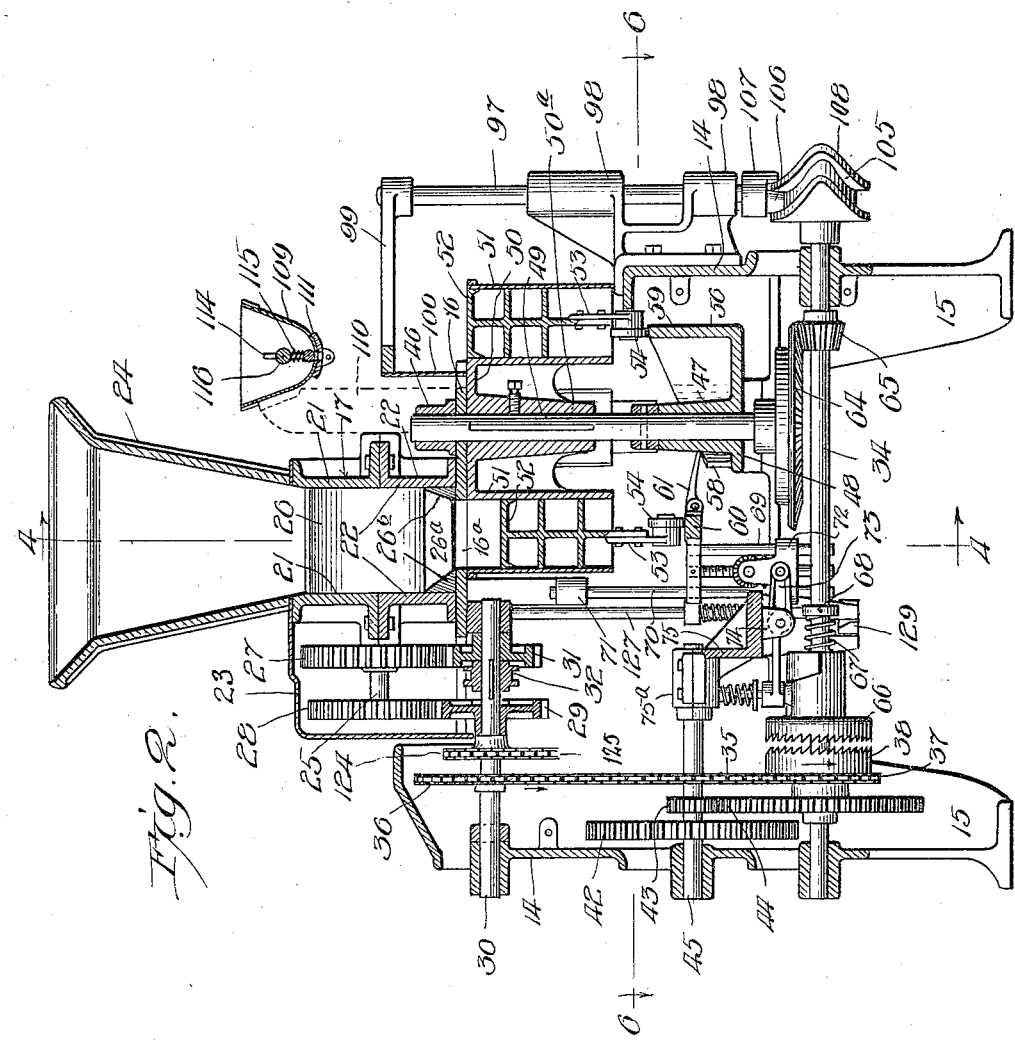

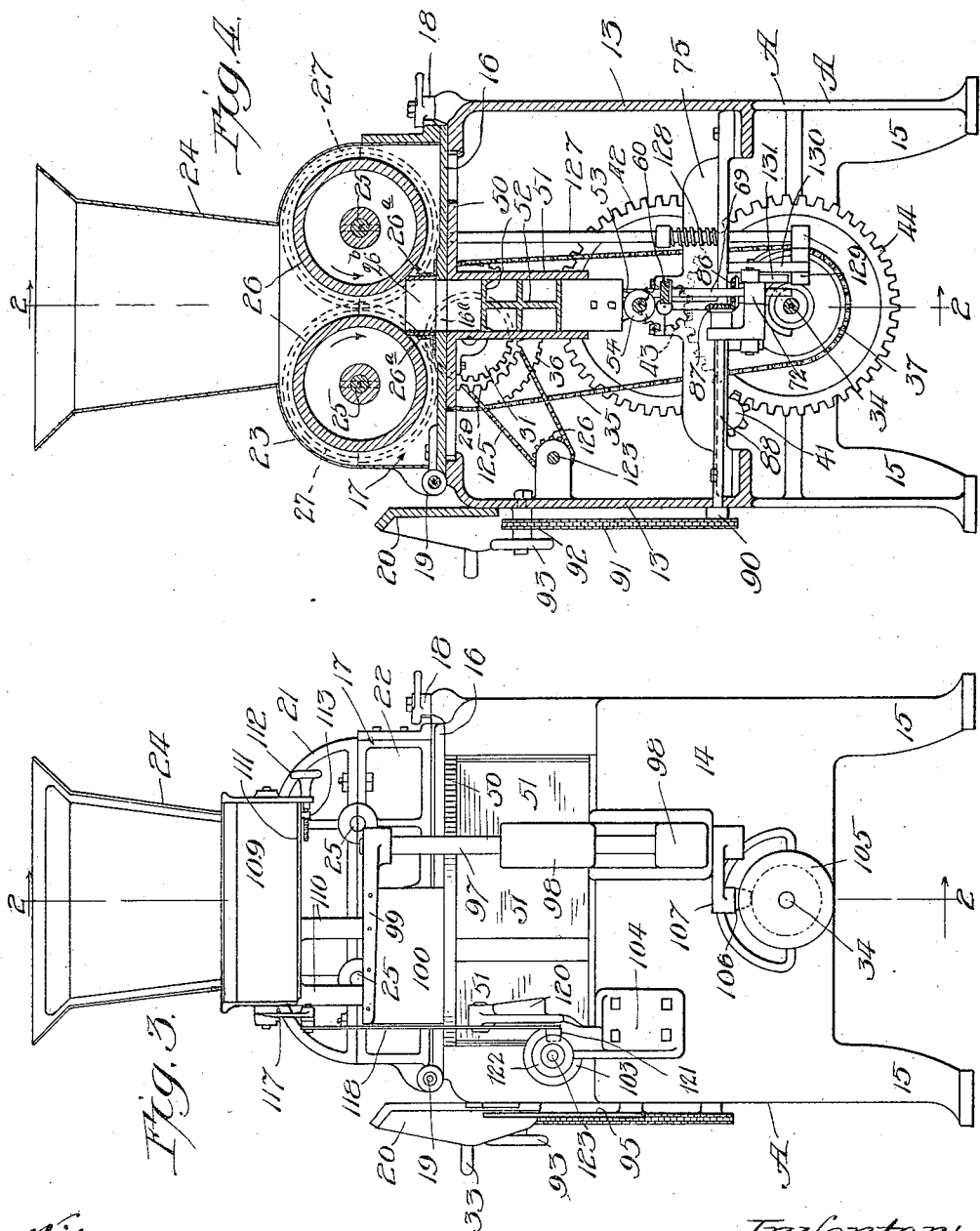

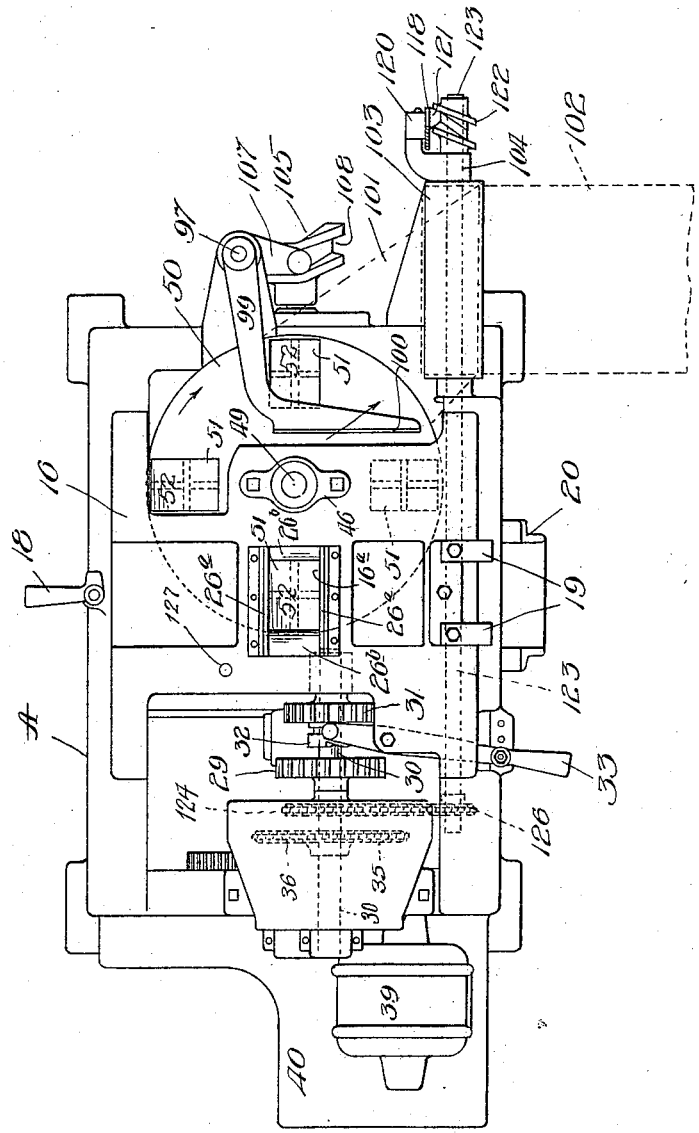

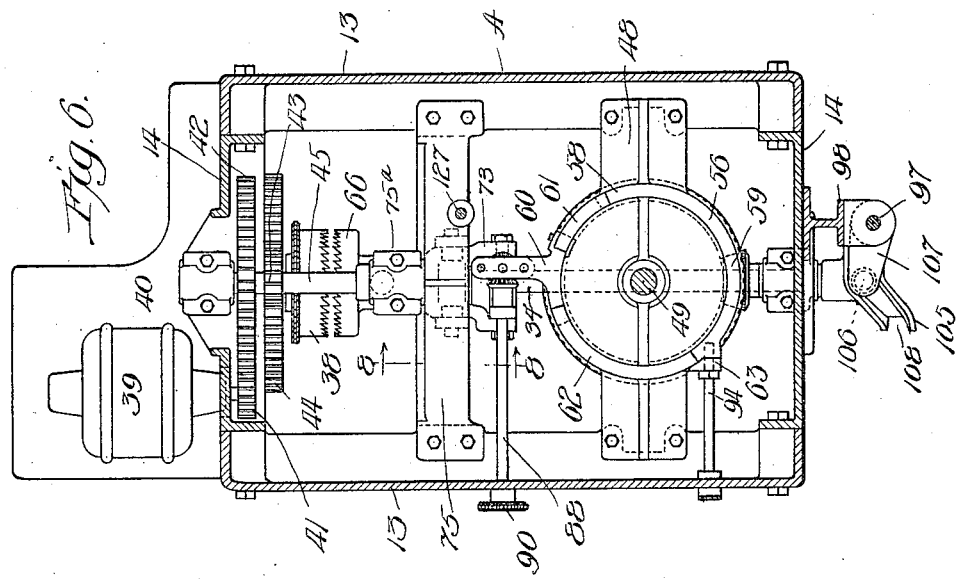

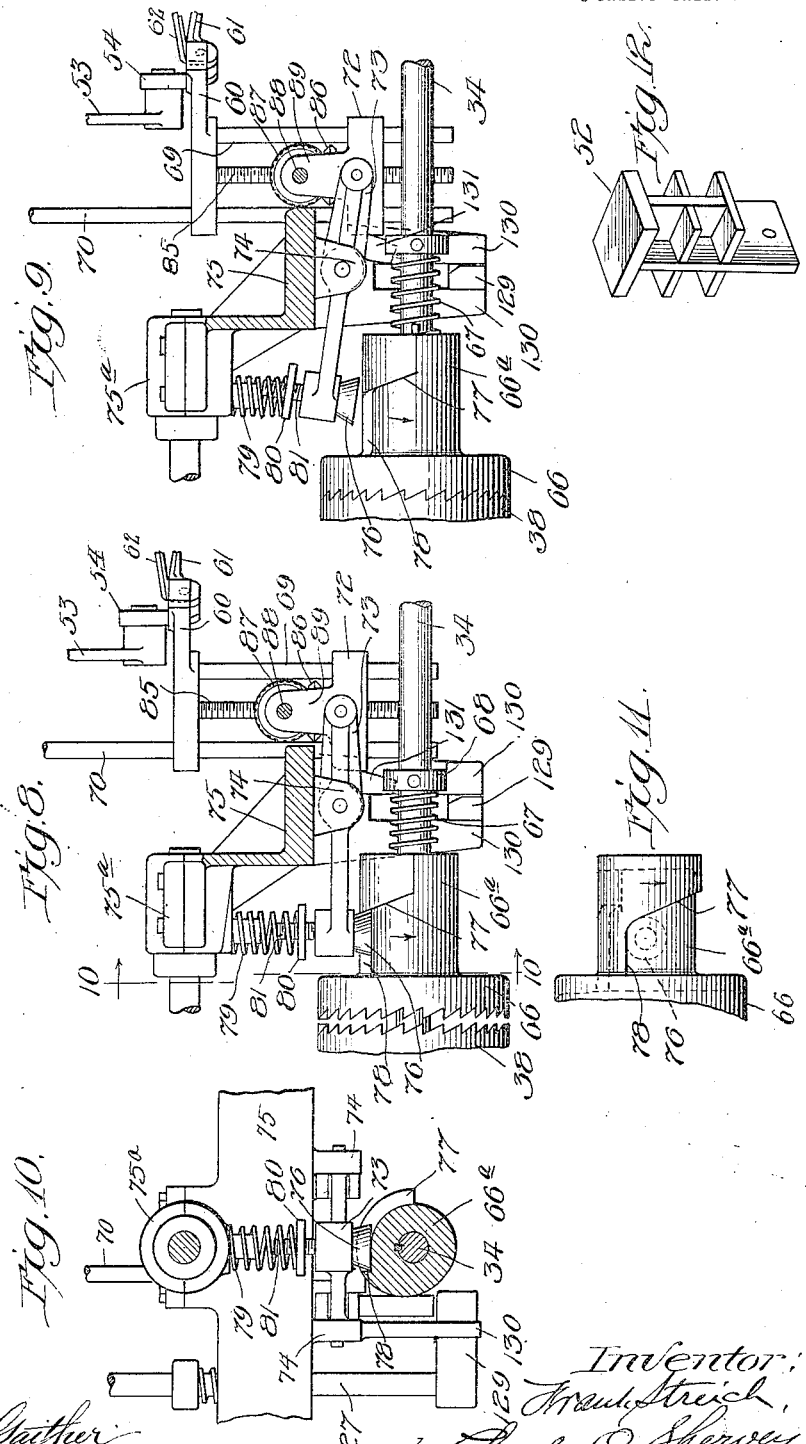

UNITED STATES PATENT OFFICE.

FRANK STREICH, OF JOLIET, ILLINOIS, ASSIGNOR TO THE UNION WRAPPING MACHINE COMPANY, OF JOLIET, ILLINOIS, A CORPORATION OF ILLINOIS.

DOUGH-SCALING MACHINE.

1,278,517.   Specification of Letters Patent.   Patented Sept. 10, 1918.

Application filed July 23, 1917. Serial No. 182,214.

*To all whom it may concern:*

Be it known that I, FRANK STREICH, a citizen of the United States, and a resident of Joliet, county of Will, and State of Illinois, have invented certain new and useful Improvements in Dough-Scaling Machines, of which the following is declared to be a full, clear, and exact description.

This invention relates to dough scaling machines, and its primary object is to provide improved means for severing measured lumps of dough from a large mass of dough. Another object is to increase the capacity of machines of this character. Another object is to provide means of adjustment of the measuring device whereby large or small lumps of dough (within a given range) may be measured and severed from the mass. Another object is to provide a dough scaling machine which shall be automatic in operation, requiring practically no attention on the part of the attendant except the ordinary care of the working parts. Other objects and advantages will appear in the course of this specification, and with all of said objects and advantages in view, this invention consists in the several novel features hereinafter fully set forth and claimed.

The invention is clearly illustrated in the drawings accompanying this specification, in which:—

Figure 1, is a side elevation of a dough scaling machine embodying a simple form of the present invention; Fig. 2, is a vertical, longitudinal section taken on the line 2—2 of Figs. 3 and 4; Fig. 3, is an end view of the machine looking in the direction of the arrow 3, in Fig. 1; Fig. 4, is a vertical cross section taken on the line 4—4 of Figs. 1, and 2; Fig. 5, is a plan of the machine with the feed roll carrying frame and hopper removed; Fig. 6, is a view partly in plan and partly in horizontal section, the line of section being indicated at 6—6 of Fig. 2; Fig. 7, is a detail plan of the tripping mechanism seen in Fig. 6; Fig. 8, is a detail view, partly in vertical, longitudinal section of the tripping mechanism, the line of section being indicated at 8—8 in Fig. 6; Fig. 9, is a view similar to Fig. 8, with the tripping mechanism shown in its tripped position; Fig. 10, is a vertical cross section taken on line 10—10 of Fig. 8; Fig. 11, is a plan of a fragment of a certain clutch collar seen in Figs. 8 to 10, inclusive, and Fig. 12, is a perspective view of one of the scale plates.

Referring to said drawings, which show the preferred embodiment of the invention, the reference character A, designates the main frame of the machine, which may comprise side frame members 13, and end frame members 14, bolted or otherwise fastened together to form a substantial and rigid frame. Preferably said frame members are in the form of cast plates having legs 15, at their lower ends. To the top of said frame A, is rigidly secured a top plate 16 (see Fig. 5) to which is hinged the feed roll carrying frame 17, which normally rests upon the top plate 16, and is held tightly thereon by a clamp 18. The hinge connection between the feed roll carrying frame and top plate is shown at 19, and a stop plate 20, is secured to the side frame member 13, adjacent the hinge connection 19, and acts to support the feed roll carrying frame when tilted back to expose the top plate 16. The frame 17, may be tilted back to expose the top plate for the purpose of cleaning the parts of the machine otherwise covered by the frame 17. In the form shown in the drawings, said feed roll carrying frame comprises upper side sections 21, and lower side sections 22, bolted or otherwise secured together, and walls 23, connecting said side members 21, 22. Secured to and extending up from the top of said feed roll carrying frame is a hopper 24, through which the mass of dough is fed into the machine.

Journaled in suitable bearings formed on said feed roll carrying frame, are two shafts 25, (see Fig. 4) upon which are rigidly fastened two feed rolls 26, which in the operation of the machine are driven in the direction indicated by the arrows thereon in Fig. 4. Said rolls are suitably spaced apart to feed the mass of dough down through an opening 16ª, into the measuring pockets of the rotatory table hereafter referred to. In the crotch between the feed rolls 26, are two vertical blades 26ª, which extend up from the edges of the opening 16ª that are parallel with the axes of the feed rolls and the upper edges of said blades are beveled off to engage with the cylindrical faces of the feed rolls, and thereby scrape off the material that clings to them. Filler blocks 26ᵇ, extend up from the other edges of the opening 16ª, and serve to deflect the material toward the opening 16ª, when the space between the side members of the feed roll carrying frame is greater than the opening 16ª. The blades 26ª, and blocks 26ᵇ, may be secured to the top plate in any desirable manner. The feed roll shafts 25, are geared together by gear wheels 27, and upon one of the shafts 25, is a gear wheel 28, of less diameter than the gear wheels 27, which gear wheel 28, meshes with a gear wheel 29, loose upon a driving shaft 30, journaled in bearings on an end frame member, and on the bottom of the top plate 16 (see Fig. 4). A fourth gear wheel 31, loose upon the shaft 30, meshes with one of the gear wheels 27. Clutch teeth are provided upon said gear wheels 29, 31, and upon a clutch collar 32, which is slidably but non-rotatively mounted upon the shaft 30, between the gear wheels 29, 31, and is shifted into engagement with either of said gear wheels 29, 31, by a lever 33, pivoted upon one of the side frame members 13, of the machine. (See Fig. 5.) By shifting the clutch collar 32, into engagement with either gear wheel 29, 31, the feed rolls are caused to rotate when the machine is in operation, and the speed of said rolls may be varied by shifting the clutch collar from one gear wheel to the other. The shaft 30, is driven by gearing here shown as comprising a sprocket chain 35, trained around a sprocket wheel 36, secured to the shaft 30, and a sprocket wheel 37, secured upon a member 38, of a clutch, which member is loosely mounted upon the main driving shaft 34. The main driving shaft 34, is intermittently rotated from any suitable source of power, and it is here shown as driven from an electric motor 39, supported upon a bracket 40, secured to one of the end frame members. Speed reducing gears 41, 42, 43, 44, are interposed between motor shaft and main driving shaft 34. The gear wheels 42, 43, are rigidly mounted on a shaft 45, journaled in suitable bearings carried by the frame of the machine, and the gear wheel 44, is loosely mounted on the shaft 34, but rigidly fastened to the clutch member 38.

Journaled in a bearing 46, secured to the top of the top plate 16, and in a bearing 47, formed upon a bracket 48, is an upright, intermittently rotated shaft 49, which has an intermittently rotating table 50, rigidly secured to it by a hub 50ª, formed on the underside of the table and keyed to said shaft 49. The bracket 48, extends transversely of the machine below the table 50, and is bolted or otherwise secured to inwardly projecting webs formed on the side frame members 13. The upper face of the rotatory table 50, and lower face of the stationary top plate 16, are set contiguous with each other, and in the operation of the machine, said rotatory table acts to sever from the mass of dough the lumps of dough which are fed down through the opening 16ª, of the top plate, and into the measuring pockets 51, of the table.

The measuring pockets 51, are disposed around the table, and extend down therefrom, and are arranged to register with the opening 16ª. In each pocket 51, is mounted a vertically reciprocatory scale plate 52, which may be of light web construction, fitting against the internal walls of the pocket. To the lower ends of said scale plates 52, are secured brackets 53, which have rollers 54, journaled thereon that run upon a circular sectional endless track, which track comprises a stationary section 56, formed on the bracket 48, and three movable sections 60, 61, 62. The tread of said stationary track section 56, inclines upwardly from the point 58 (see Fig. 7) to the point 59, and the parts are so proportioned that when the roller 54, of any plunger reaches the point 59, on the inclined tread of the track 56, the upper surface of the scale plate 52, will be flush with the upper surface of the rotatory table 50. The remainder of the sectional track comprises a trip block 60, a track section 61, hinged to said trip block 60, with its free end resting upon the inclined tread of the stationary track 56, and a track section 62, hinged to the stationary portion of the track 56, at 63; said track section 62 rests upon the trip block 60, as clearly indicated in Figs. 6, and 7. In the operation of the machine, the downward pressure of any roller 54, upon the trip block 60, depresses said block, and therewith other parts of the tripping mechanism, setting in motion the table carrying shaft 49, and afterward said roller travels along the track section 61, up the inclined tread of the stationary track section 56, and thereafter upon the track section 62, and back to the trip block. At the highest portion of the stationary track section, each lump of dough, which has been measured in a pocket of the rotatory turntable, is ejected from said pocket, and pushed off the table by mechanism that will be described hereafter.

The rotatory table is given an intermittent rotatory movement by suitable mechanism, here shown as comprising a bevel gear wheel 64, secured upon the lower end of the shaft 49, and meshing with a bevel pinion 65, fast upon the main driving shaft 34. Intermittent rotatory motion is imparted to the shaft 34, from the continuously rotating clutch collar 38, by a clutch collar 66, slidably and non-rotatively mounted upon the shaft 34, and having clutch teeth co-acting with clutch teeth upon the clutch collar 38. A coiled compression spring 67 interposed between a collar 68, fast to the shaft 34, and the end of the clutch collar 66, operates to throw the clutch collar 66, into engagement with the clutch collar 38, whenever permitted to do so by the tripping mechanism.

The tripping mechanism is best seen in Figs. 8, to 10, inclusive, and comprises the trip block 60, which forms part of the sectional track, and tripping mechanism interposed between said block and the clutch collar 66. In the preferred embodiment of the invention, said trip block 60, has two vertically extending rods 69, 70, secured to it, one of which (70) extends upward beyond the trip block and is guided in a bracket 71, (see Fig. 2) secured to and extending down from the top plate 16. The lower ends of said rods 69, 70, extend through a block 72, and are slidably held therein. Said block 72, and the parts carried thereby, are supported by a lever 73, fulcrumed upon lugs 74, which project down from a transversely extending bracket 75, bolted or otherwise secured to inturned webs of the side frame members 13, said lever 73, is forked at one end and the forks straddle the block 72, and are fulcrumed to its sides. The opposite end of the lever 73, has a roller 76, secured upon its lower side, which roller, under normal conditions, engages with a cam-like or inclined shoulder 77, formed on the neck 66ª, of the clutch collar 66, thereby holding the clutch collar 66, out of engagement with the clutch collar 38. Said inclined or cam-like shoulder 77, continues behind the roller 76, in a line parallel with the axis of said clutch collar 66, and in the operation of the machine, said shouldered portion 78, comes into engagement with the roller 76, immediately after the clutch collars 66, 38, have become disengaged, thereby arresting the rotatorial movement of the shaft 34, and consequent rotatorial movement of the table 50, at a point where one of the pockets thereof is in register with the opening 16ª, of the top plate 16. The roller carrying end of the lever is yieldingly held down by a spring 79, interposed between the bottom of a bearing 75ª, and a collar 80, adjustably secured on a screw threaded pin 81, which projects up from the lever 73. The tension on the spring may be varied by screwing the collar up or down on the pin 81. In Fig. 8, the trip block is shown in its uppermost position with the forked end of the lever 73, raised, and the end carrying roller 76, depressed, and Fig. 9, shows the trip block and the forked end of the lever 73, depressed, and the roller carrying end raised. It is to be observed that as soon as the roller 76, is lifited out of engagement with the shouldered portion 77, of the clutch collar 66, the spring 67, moves the clutch collar 66, into engagement with the continuously rotating clutch collar 38, whereupon the shaft 34, is caused to rotate, and rotation of the table 50, is thereby effected. As soon as the scale plate supporting roller 54, runs off the trip block 60, the spring 79, forces the roller carrying end of the lever 73, down, bringing the lower face of the roller upon the neck of the clutch collar 66, and as the shouldered portion 77, reaches said collar, it is moved toward the right, as viewed in Fig. 9, by said roller 76, thereby disengaging the clutch collars 66, 38.

For the purpose of increasing or decreasing the capacity of the pockets 51, the trip block 60, is made vertically adjustable with respect to the block 72, thereby permitting the scale plate to occupy a higher or lower position with relation to the top of the rotatory table, depending upon the position of the trip block. A simple means for varying this adjustment may comprise a screw threaded rod 85, secured to the trip block, and extending down through an opening in the block 72. A bevel pinion 86, rests upon the top of said block 72, and its central aperture is threaded for engagement with the screw threaded rod 95. Meshing with said bevel pinion 86, is a bevel pinion 87, carried upon the inner end of a shaft 88, which is journaled in an upstanding ear 89, formed on the block 72, and said shaft 88, extends out through the side frame of the machine, and has a wheel 90, secured upon its outer end, which may be turned to rotate the pinions 87, 86, and thereby raise or lower the screw threaded shaft 85, and therewith the trip block 60, and rods 69, 70. For convenience, the wheel 90, may comprise a sprocket wheel, which may be driven by a chain 91, trained around a second sprocket wheel 92, located near the top of the side frame member, and journaled on a stud secured to the side frame. Conveniently a hand wheel may be secured to the sprocket wheel 92, for turning it.

The pivot rod 94, of the track section 62, (see Fig. 6) extends out through the side frame member, and has a pointer 95, secured upon its protruding end, which pointer indicates upon a graduated scale 96, the quantity of dough measured in each pocket of the table 50. By lowering the trip block 60, the scale plates are permitted to occupy lower positions in the pockets at the time the dough is fed into the pockets by the rolls 26, and when the trip block 60, is lowered, the track section 62, swings down with the trip block, thereby turning the pointer 95, to the left, as viewed in Fig. 1, and indicating upon the dial the position of the scale plates when they rest upon the trip block, and consequently the quantity of dough measured therein.

As has been heretofore stated, the scale plates reach the uppermost limit of their movement when the rollers 54, reach the highest point 59, of the inclined track 56, thereby discharging the lumps of dough from the pockets 51. Means are provided for pushing the discharged lumps of dough from the table 50, and said means will now be described.

At one end of the machine is a vertical rock shaft 97, which is journaled in a bearing bracket 98, secured to the adjacent end frame member 14, and said vertical shaft 97, carries at its upper end an arm 99, to which is secured a vertically extending blade 100, whose lower edge rests upon the upper surface of the table 50. Said arm 99, is moved by suitable means in the direction of the arrow indicated thereon in Fig. 5, to push the lumps of dough from the table, and on to an inclined chute, indicated by the dotted lines 101, in Fig. 5, from which it rolls down upon an endless conveyer belt 102, trained around a roller 103, journaled on the frame of the machine, and on a bracket 104, secured thereto. The arm 99, is timed to swing in the direction of the arrow thereon (see Fig. 5) when any pocket reaches a position in front of it, at which time the lump of dough has been discharged from said pocket, and is lying on top of the plunger in position to be pushed off the table. The means for oscillating the dough discharging arm 99, comprises a cam 105, on the shaft 34, (see Figs. 1, 2, 3, and 5) which cam engages with a roller 106, carried by a crank arm 107, secured upon the lower end of the shaft 97. The cam 105, has a substantially V-shaped cam surface 108, which is arranged to oscillate the arm 107, back and forth, once during each revolution of the shaft 34, and timed to reciprocate said arm 107, and therewith the dough discharging arm 39, at the time when a pocket reaches a position in front of the blade 100. It is to be observed that at the place where the blade 100 rests upon the table 50, the top plate 16, is cut away, and this cutaway portion extends back beyond the shaft 49, as is clearly indicated in Fig. 5, to permit the dough to be ejected from the pockets when the plungers move upward.

A flour receptacle 109, is supported above the exposed portion of the table 50, by a standard 110, secured to the top plate. The bottom of the flour receptacle is perforated and below said perforated portion is a perforated plate 111, which may be adjusted back and forth by a screw 112, carried by an end wall of the receptacle, and threaded in an ear 113, projecting down from the plate 111. This furnishes means for regulating the size of the discharge perforations. Within the receptacle 109, is a yoke-shaped stirrer 114, the main portion of which is pressed down upon the bottom of the receptacle by springs 115, encircling the upwardly extending arms of the yoke-shaped stirrer. Said arms pass through holes in a stirrer shaft 116, which is journaled in the end walls of the receptacle 109, and said shaft 116, has an arm 117, secured upon its outer end, which arm is connected to a lever 118, by a link 119, (see Fig. 1). The lever 118, is fulcrumed upon a bracket 120, extending up from the bracket 104, and the lower end of said lever 118, carries a roller 121, which is engaged by a cam 122, mounted upon the outer end of a shaft 123. Said cam is constructed and arranged to oscillate the lever 118, and therewith oscillate the stirrer 114, and may comprise two annular flanges lying oblique with respect to the axis of the shaft. The shaft 123, runs lengthwise of the machine, and is journaled in brackets extending in from one side frame member. Said shaft 123, is driven from the shaft 30, by a sprocket wheel 124, secured upon said shaft 30, and a sprocket chain 125, trained around said sprocket wheel 124, and a sprocket wheel 126, fast upon the shaft 123.

A safety device is provided for preventing rotation of the shafts 34, 49, and table 50, when the feed roll carrying frame is raised, and said safety device may comprise a vertical rod 127, which extends through a hole in the top plate under one of the side members of the feed roll carrying frame. Said rod extends down through a hole in the bracket 75, and a spring 128, encircles said rod and is interposed between said bracket and a collar secured to the rod, said spring acts to raise the rod 127, whenever the frame 17, is tilted back. Upon the lower end of said rod 127, is secured a block 129, which is movable in a vertical direction between a forked lug 130. The forks prevent horizontal movement of the block. The lever 73, has a downwardly projecting lug 131, adjacent the block 129, which, when the frame 17, is down, swings over the block, but which strikes against the block 129, when the latter is raised by the spring 128, thereby preventing the lever 73, from being moved far enough to raise the roller 76, out of engagement with the cam or inclined shoulder 77. Whenever the frame 17, is tilted back, the spring moves the rod 127, up, thereby bringing the block into position behind the lug 131. When the frame 17, is lowered, it strikes the protruding end of the rod 127, and depresses it, thereby moving the block 129, out of the way of the lug 131.

In operation, the electric motor 39, is started, and the lever 33, moved to shift the clutch 32, into engagement with either sprocket wheel 29, 31, depending upon the consistency of the dough. With certain grades of dough, the feed rolls may be run more rapidly than with other grades of dough; consequently, the clutch is shifted accordingly. The mass of dough is then deposited into the hopper 24, and is fed by the feed rolls, down through the chute formed by the walls 26ª, 26ᵇ, and out through the opening 16ª, of the top plate 16, and into the pocket 51, of the table 50, which registers with said opening. At this time the scale plate, in register with said opening 16ª, is located at the lower end of the pocket and forms the bottom thereof. In feeding the dough down through the chute, the rolls compress the dough, but it is free to expand after it leaves the rolls. As soon as the dough enters the pocket, it expands and, as soon as the pocket is filled with dough, and the weight and expansive pressure upon the scale plate 51, overcomes the tension of the spring 79, of the trip mechanism, the trip block 60, is depressed, and the roller 76, lifted above the shouldered portion 77, whereupon the spring 67, forces the clutch collar 66, into engagement with the continuously running clutch collar 38; the shaft 34, is thereby rotated, and rotation is imparted to the shaft 49, by the bevel pinion 65, and bevel gear wheel 64, and therewith the table 50, is rotated, the latter severing the lump of dough contained in the pocket 51, from the remainder of the mass above the table. The scale plate supporting roller 54, moves with the scale plate and table, and travels along the hinged track section 61, and the stationary section 56, of the circular track. The spring 79, thereupon depresses the lever 73, and therewith the roller 76, and when the table has been moved almost ninety degrees, from its original position, the inclined shouldered portion 77, of the clutch collar 66, comes into contact with the roller 76, and said clutch collar is moved back out of engagement with said clutch collar 38, the shouldered part 78, engaging with said roller 76, at the instant the next pocket in the table registers with the opening 16ª, of the top plate, at which time said pocket is filled with dough, and the trip block is tripped again, as before. While the table is in motion, the top thereof closes the opening 16ª, and the continued rotation of the feed rolls causes a compression of dough in the chute there below. Consequently, as a pocket reaches the opening 16ª, the dough quickly fills the pocket and being released from its compressed spaced in the chute, expands and depresses the scale plate, thereby tripping the trip mechanism. During the time any roller travels up the inclined tread of the stationary track 56, its scale plate is being raised, and as the said roller reaches the highest point 59, of the track, the upper surface of the scale plate reaches the upper surface of the table, and ejects the lump of dough from the pocket. Immediately afterward, the cam surface 108, of the cam 105, engages the roller 106, of the lever 107, and swings the dough discharging arm 99, and therewith the blade 100, in the direction of the arrow thereon in Fig. 5, thereby sweeping the lump of dough off the table, and on to the inclined chute 101, down which it rolls, and on to the conveyer belt 102. The return cam portion of the cam 105, thereafter moves the lever 107, and therewith the arm 99, and blade 100, back to former position. After the scale plates pass the highest point of the track they return to their original position at the bottom of the pockets under the influence of gravity, the rollers 54, rolling down the decline of the track as the table brings the scale plates back to the opening 16ª. The stirrer 114, in the flour receptacle is reciprocated by the mechanism described, thereby depositing flour upon the table at its exposed portion. To vary the size of the lumps of dough, the hand wheel 93, is turned in the proper direction, the pointer 95, and graduated scale 96, indicating to the attendant the weight or volume of the lumps of dough which are being measured in the pockets.

More or less variation of the exact details of construction shown and described, is possible, without departing from the spirit of this invention. I desire, therefore, not to limit myself to the exact construction shown and described, but intend in the following claims to point out all of the invention disclosed herein.

I claim as new and desire to secure by Letters Patent:

1. In a machine of the class described, the combination of a horizontal, intermittently rotated table having measuring pockets therein, means for feeding dough into said pockets, a scale plate in each pocket located at the bottom of the pocket during the pocket filling action of the feeding means, table rotating means, a circular, endless track having an inclined portion acting to raise said scale plates to the surface of the table, and trip mechanism actuated by said scale plates for setting said table rotating means in motion.

2. In a machine of the class described, the combination of a horizontal, intermittently rotated table having vertical measuring pockets therein, means for feeding dough into said pockets, a vertically movable scale plate in each pocket, intermittently operating table rotating means, trip mechanism, and a circular, sectional, endless track having a trip block therein forming part of said trip mechanism, and an inclined tread, said track supporting the scale plates and said inclined part acting to raise the scale plates and therewith eject the dough from the pockets, said trip block acting when depressed to set the table rotating means in motion.

3. In a machine of the class described, the combination of a horizontal, intermittently rotated table having measuring pockets therein, means for feeding dough into said pockets, a scale plate in each pocket forming the bottom thereof, table rotating means, comprising a continuously rotating member, an intermittently rotating shaft and clutch mechanism for coupling the continuously rotating member and intermittently rotating shaft together, a circular, sectional, endless track having an inclined tread portion, said track supporting the scale plates and the inclined tread portion acting to raise the scale plates and thereby eject the dough from the pockets, and trip mechanism for operating said clutch mechanism, having a trip block arranged to be depressed by said scale plates.

4. In a machine of the class described, the combination of a horizontal, intermittently rotated table, having measuring pockets therein, means for feeding dough into said pockets, a scale plate in each pocket forming the bottom thereof, intermittently operating table rotating means, a circular, endless scale plate supporting track having an inclined portion arranged to raise the scale plates and thereby eject the dough from the pockets, and trip mechanism for setting in motion said table rotating means, said trip mechanism being actuated by the scale plates.

5. In a machine of the class described, the combination of a horizontal top plate having an opening therethrough, an intermittently rotated horizontal table set contiguous with said plate, and having vertical measuring pockets formed therein, each of which is arranged to register with said opening, dough feeding means for feeding dough through said opening and into the pocket in register therewith, a vertically, movable scale plate in each pocket, table rotating means, a circular, endless, scale plate actuating track supporting said scale plates and having an inclined tread portion arranged to raise said scale plates and thereby eject the dough from the pockets, and tripping mechanism for setting in motion said table rotating means, actuated by said scale plates.

6. In a machine of the class described, the combination of an intermittently rotated horizontal table having vertical measuring pockets therein, means for feeding dough into said pockets, table rotating means including a continuously rotating shaft, an intermittently rotated shaft and releasable connection therebetween, a vertically movable scale plate in each pocket, movable from one position to another position under the influence of gravity, scale plate actuating means supporting said scale plates, and tripping mechanism for setting in motion and arresting said table rotating means, said tripping mechanism being actuated by said scale plates solely for setting the table rotating means in motion and having means independent of the scale plates for maintaining said releasable connection in connected position.

7. In a machine of the class described, the combination of an intermittently rotated horizontal table having vertical measuring pockets therein, means for feeding dough into said pockets, a gravity actuated, vertically movable scale plate in each pocket, scale plate actuating means supporting said scale plates, table rotating mechanism, including a continuously rotating shaft, an intermittently rotated shaft and releasable connection therebetween, and trip mechanism for setting in motion and arresting the table rotating means, said trip mechanism having a trip block acted upon by the scale plates, solely to set the table rotating means in motion and having means independent of the scale plates of maintaining said releasable connection in connected position and being adjustable relative to the table and other members of the trip mechanism, whereby the volume of the pockets may be varied.

8. In a machine of the class described, the combination of an intermittently rotated horizontal table having vertical pockets therein, means for feeding dough into said pockets, a vertically movable, gravity actuated scale plate in each pocket, scale plate actuating means supporting said scale plates, a continuously rotating driving element, an intermittently rotating table driving shaft, clutch mechanism between said continuously rotating element and shaft, and trip mechanism for clutching and unclutching said clutch mechanism, said trip mechanism having a member actuated by the scale plates solely for clutching the clutch mechanism, and having means independent of the scale plates for maintaining the clutch mechanism in clutched position, and said member being adjustable toward and away from said pockets, whereby the capacity thereof may be varied.

9. In a machine of the class described an intermittently rotated horizontal measuring table having pockets therein, vertically movable, gravity actuated scale plates in said pockets, a continuously rotated element having one member of the clutch secured thereto, an intermittently rotated table driving shaft having the other member of the clutch mounted thereon, a circular, endless track supporting said scale plates and having a trip block therein, a trip lever and adjustable connections between said trip block and said trip lever for varying the distance between said trip block and table, said trip lever and clutch member on the intermittently rotating shaft having co-acting means for retracting said clutch member from the other clutch member, and means associated with the scale plates for actuating said trip block.

10. In a machine of the class described, an intermittently rotated horizontal measuring table having pockets therein, vertically movable, gravity actuated scale plates in said pockets, a circular, endless track supporting said scale plates, driving mechanism for said table, and tripping mechanism for setting said driving mechanism in motion, said tripping mechanism comprising a trip block which forms part of said track, a trip lever arranged to arrest movement of part of the table driving mechanism, a block fulcrumed upon said trip lever, rods secured to said trip block, and extending through holes in the block carried by the lever, one of said rods being screw threaded, a bevel pinion resting on the block carried by the trip lever, and having an internally screw threaded hub portion screwed upon said screw threaded rod, a second bevel pinion meshing with said first mentioned bevel pinion, a shaft for turning said second mentioned bevel pinion, and means associated with the scale plates for actuating said trip block.

11. In a machine of the class described, an intermittently rotated horizontal measuring table having pockets therein, vertically movable, gravity actuated scale plates in said pockets, a circular, endless track supporting said scale plates, driving mechanism for said table, having a continuously rotated part, and an intermittently rotated part adapted to be clutched thereto, tripping mechanism for setting in motion said intermittently rotated part of the mechanism, comprising a trip block which forms part of said track, a trip lever adjustably connected thereto, and having means for engaging the intermittently rotated part of the driving mechanism, and unclutching it from the continuously rotating part, a spring for yieldingly holding said lever in engagement with said intermittently rotated part of the driving mechanism, and means associated with the scale plates for actuating said trip block.

12. In a machine of the class described, an intermittently rotated horizontal measuring table having pockets therein, vertically movable, gravity actuated scale plates in said pockets, a circular, endless track supporting said scale plates, driving mechanism for said table, having a continuously rotating part, and an intermittently rotated part adapted to be clutched thereto, tripping mechanism for setting in motion said intermittently rotated part of the table driving mechanism, comprising a trip block which forms part of said track, a trip lever connected thereto, said lever having means for disconnecting the members of the clutch from each other, a spring for yieldingly holding said lever in engagement with said clutch member, a stop for limiting the movement of said trip lever, and means associated with the scale plates for actuating said trip block.

13. In a machine of the class described, the combination of a frame having a horizontal top plate formed with an opening for the discharge of the dough therethrough, an intermittently rotated horizontal measuring table journaled in said frame below said top plate and having vertical measuring pockets arranged to register with said hole in the top plate, a feed roll carrying frame hinged to said main frame above the top plate and resting thereon, intermittently rotated table driving means, including tripping mechanism, and means associated with the table for actuating said tripping mechanism.

14. In a machine of the class described, the combination of a horizontal, intermittently rotated measuring table having measuring pockets therein, feed rolls for feeding dough into said pockets, a vertically movable, gravity actuated scale plate in each pocket for ejecting dough from the pocket, driving means for intermittently rotating said table, scale plate actuating means, and means for brushing the lumps of dough from the table after they have been ejected by the scale plates, said last mentioned means being operated from the table driving mechanism.

15. In a machine of the class described, the combination of a frame having a top plate formed with an opening therethrough, a feed roll carrying frame on said top plate, feed rolls journaled therein, an intermittently rotated vertical shaft journaled in said frame, a table secured to said shaft and lying under and contiguous with said top plate, said table having measuring pockets arranged to be brought into register with said opening in the top plate, a gravity actuated scale plate in each pocket, a circular, endless scale plate actuating track having an inclined portion, a continuously rotating driving element, gearing between the latter and the feed rolls for continuously rotating said rolls, an intermittently rotated table driving shaft, geared to said vertical shaft, clutch mechanism between said continuously rotating element and said intermittently rotated table driving shaft, and tripping mechanism operated by said scale plates for said clutch mechanism.

16. In a machine of the class described, a horizontal, intermittently rotated table formed with downwardly extending pockets, gravity actuated scale plates movable in said pockets from a first position to a second position, and having rollers journaled at their lower ends, a circular, endless, sectional track upon which said rollers travel, said track having an inclined portion for lifting the scale plates to a second position, tripping mechanism for setting said driving mechanism in motion, said tripping mechansm having a trip block interposed in said sectional track.

17. In a machine of the class described, a horizontal table having downwardly projecting dough receiving pockets, gravity actuated scale plates movable in said pockets from a first to a second position, driving mechanism for said table, tripping mechanism, a circular, sectional, endless track for supporting said scale plates in both positions, one of said sections of said track being movable and acting as a member of the trip mechanism one section of said track being hinged to said movable section, and lying upon a stationary portion of the track, and a third section being hinged to said stationary portion, and lying upon said tripping mechanism.

18. In a machine of the class described, a horizontal table having downwardly extending pockets, gravity actuated scale plates movable in said pockets from a first position to a second position, table driving mechanism and trip mechanism therein, an endless scale plate actuating track having a member of the tripping mechanism interposed therein, adjustable lengthwise of the pockets to vary the location of said first mentioned position of the scale plates, and a swinging section hinged to a stationary section of the track and lying upon said tripping mechanism, a rod secured to said hinged section, and having a pointer upon its end, and a graduated scale coöperating with said pointer to indicate the location of said first named position of the scale plates.

19. In a machine of the class described, the combination of a horizontal, intermittently rotated table having measuring pockets therein, means for feeding dough into said pockets, partly by gravity, a scale plate in each pocket, and forming the bottom thereof, said scale plates being acted on by the combined weight and expansion of the dough in the pockets, table rotating means, a circular, endless track having an inclined tread portion, said track supporting said scale plates, and the inclined portion acting to raise said scale plates to the surface of the table, and trip mechanism actuated by said scale plates for setting said table rotating means in motion.

20. In a machine of the class described, the combination of a horizontal, intermittently rotated table having vertical measuring pockets therein, means for feeding dough into said pockets, partly by gravity, a vertically movable scale plate in each pocket forming the bottom of the pocket and movable in a downward direction under the influence of gravity, intermittently operating table rotating means, trip mechanism, and a circular sectional, endless track having a trip block therein and forming part of said trip mechanism, and an inclined tread, said track supporting the scale plates and said inclined part acting to raise the scale plates and therewith eject the dough from the pockets, said trip block acting when depressed to set the table rotating means in motion.

21. In a machine of the class described, the combination of a horizontal, intermittently rotated table having measuring pockets therein, means for feeding dough into said pockets comprising feed rolls which act to compress the dough, and a chute between the feed rolls and table in which the dough is fed, a scale plate in each pocket and forming the bottom thereof, said scale plate being acted on by the combined weight and expansion of the dough in the pocket, table rotating means, a circular, endless track having an inclined tread portion, said track supporting said scale plates, and the inclined portion acting to raise said scale plates to the surface of the table, and trip mechanism actuated by said scale plates for setting said table rotating means in motion.

FRANK STREICH.

Copies of this patent may be obtained for five cents each, by addressing the "Commissioner of Patents, Washington, D. C."